UNITED STATES PATENT OFFICE.

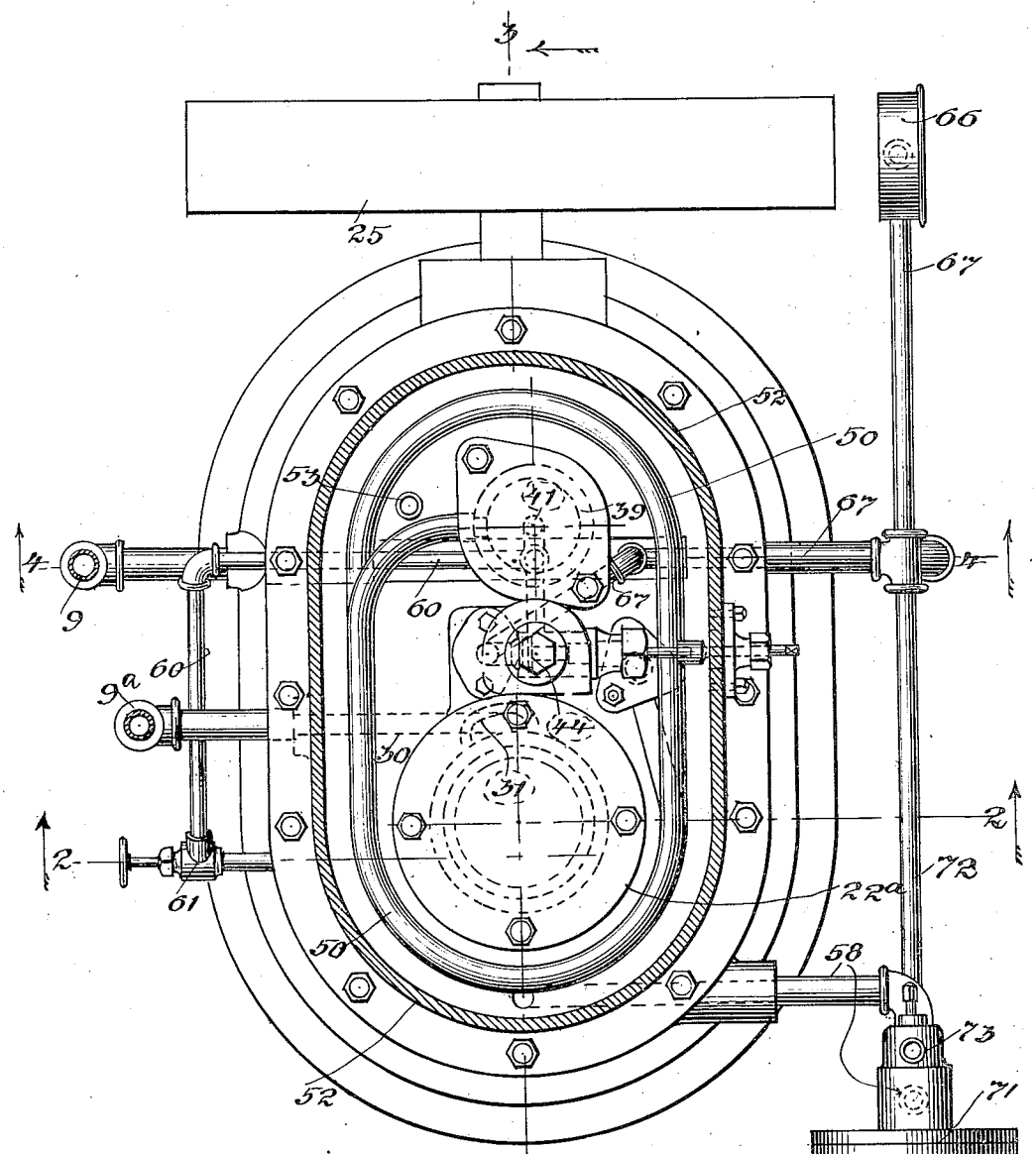

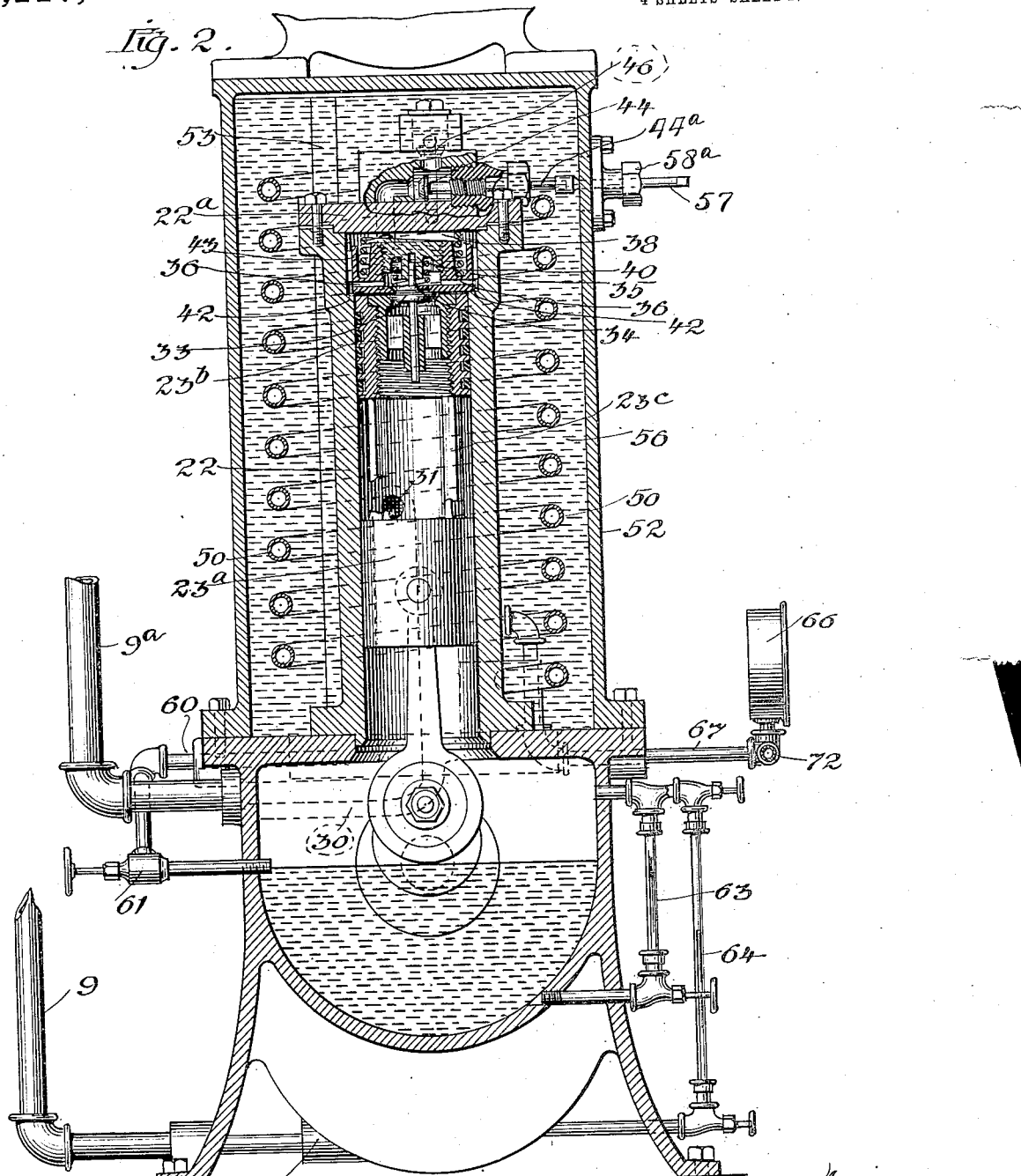

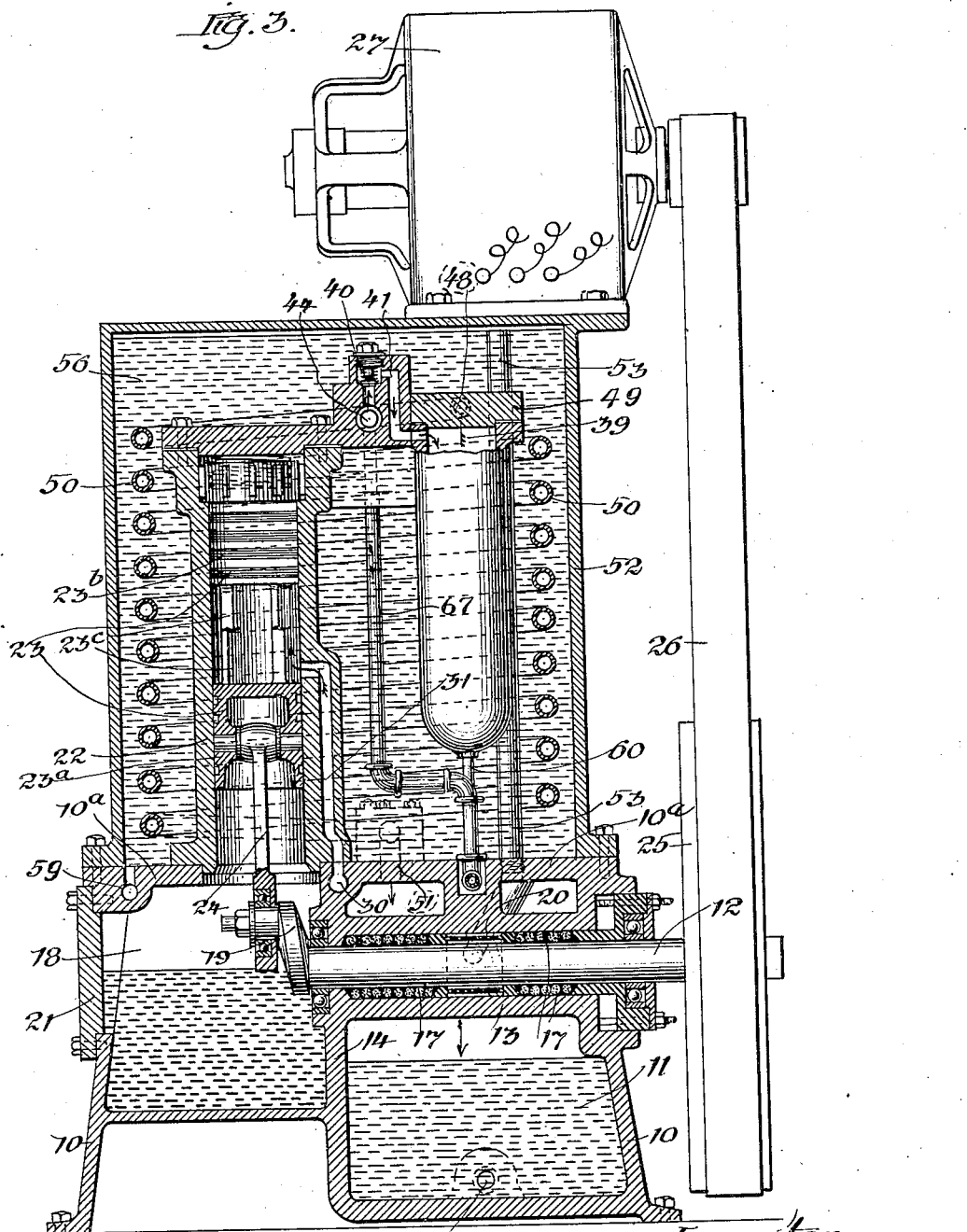

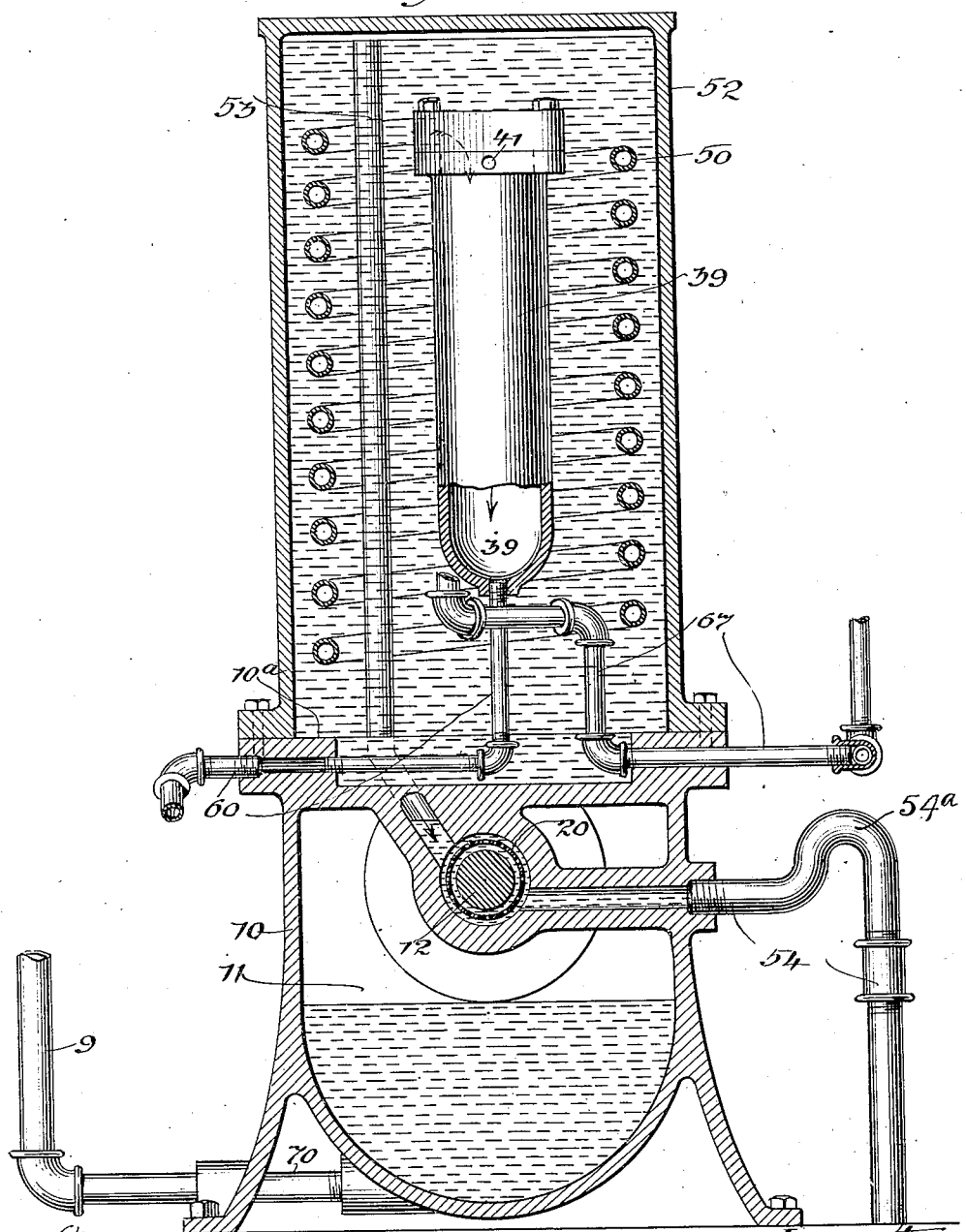

CHARLES C. HANSEN, OF FOREST PARK, AND AUGUST P. ANDERSON, OF CHICAGO, ILLINOIS, ASSIGNORS TO PEERLESS ICE MACHINE CO., OF CHICAGO, ILLINOIS, A CORPORATION OF ILLINOIS.

ICE-MACHINE.

1,117,186.   Specification of Letters Patent.   Patented Nov. 17, 1914.

Application filed July 26, 1912. Serial No. 711,625.

*To all whom it may concern:*

Be it known that we, CHARLES C. HANSEN and AUGUST P. ANDERSON, residents of Forest Park, county of Cook, and State of Illinois, and Chicago, county of Cook, and State of Illinois, respectively, have invented new and useful Improvements in Ice-Machines, of which the following is a full, clear, and exact description.

The invention relates to refrigerating apparatus.

One object of the invention is to provide an improved apparatus in which the compressor and associated parts are all inclosed within a single structure so that it may be confined within a small compass and the necessity of extensive connections between the parts will be avoided. Such a structure is of particular advantage in places where small equipment suffices, for example, such as are adapted for household use or other places where smaller plants and simplicity in the structure are desired. An advantage of this arrangement and structure is that its parts can be inclosed and submerged in a body of water to prevent any odor from the refrigerant, such as ammonia, should a leak occur, from permeating the store or house.

The invention consists in the several novel features hereinafter set forth and more particularly defined by claims at the conclusion hereof.

In the drawings: Figure 1 is a plan view with top of hood removed. Fig. 2 is a section taken on line 2—2 of Fig. 1. Fig. 3 is a section taken on line 3—3 of Fig. 1. Fig. 4 is a section taken on line 4—4 of Fig. 1.

The apparatus comprises a circulating line 9 and 9ª for the refrigerating liquid which may be connected to cool a refrigerator or room as may be desired and in which circulation is maintained by a compressor which forces the spent refrigerant through a condensing coil and back through the supply. The compressor, condensing coil, and supply of refrigerant are all disposed in a closed structure through which a body of water circulates to cool and condense the refrigerant.

The inclosing structure comprises a base 10 at one side of which a chamber 11 is formed for containing the cooling agent or refrigerant, for example, ammonia, under high pressure. A vertical wall 14 is formed in base 10 and a housing 13 extends from said wall to one of the end walls of the base, and a compressor-shaft 12 passes through said housing and is sealed from the refrigerant in chamber 11. Suitable anti-friction bearings are provided for the ends of the compressor-shaft respectively, and suitable packings 17 are provided around the shaft to prevent leakage of the lubricating oil from a chamber 18 in which the crank 19 at the inner end of the shaft 17 operates. Chamber 18 is formed between partition 14 and one end of base 10.

An annular chamber 20 is formed around the central portion of the shaft 12 and water is caused to circulate through this chamber for the purpose of absorbing any odor or fumes which might otherwise escape around said shaft, this chamber being disposed between packings 17 so that the water will not escape. This bearing thus serves an important purpose in rendering the apparatus odorless in operation. Water is conducted to said chamber 20, by an overflow pipe 53, and from said chamber by a discharge pipe 54.

Chamber 18, which is disposed at one side of the base 10 and between cross wall 14 and one end of the walls of the base, serves to contain lubricating oil for the compressor, crank and wrist pin. An opening which is normally closed by a cover 21, is formed in one end of base 10 for access to crank 19 and said chamber. Upon the top 10ª of base 10, a compressor-cylinder 22 is secured and a two-part piston 23 which is operatively connected to a pitman 24 which is driven by crank 19 on shaft 12. A pulley 25 is secured to the outer end of shaft 12 and is driven by a belt 26 from an electric motor 27 which is mounted on top of the refrigerating apparatus. This piston is operated to draw the spent refrigerant through the line, compress it and force it back into chamber 11. The return branch 9ª of the circulating line is connected to a port 30 which is formed in the top 10ª of base 10, and a duct 31 extends vertically from said port and leads into the cylinder 22. This piston comprises a lower member 23ª, an upper member 23ᵇ and connecting ribs 23ᶜ. Piston-member 23ᵇ is provided with a check valve 33 which is adapted to open on the down-stroke of the piston to admit refrigerant from duct 31 to the compression-chamber above said member, in which the refrigerant will be compressed and thence forced through a check-valve 34 which is adapted to close against a seat in a valve-cage 35 which is mounted in the upper end of cylinder 22. The upper piston member 23ᵇ carries the check valve and the lower piston member 23ᵃ prevents the refrigerant from passing into the oil chamber 18. The refrigerant forced through valve 34 passes through ducts 36 in cage 35, to a chamber 38 from which a duct 41 in cylinder-head 22ᵃ, leads to an oil-trap 39. Valve 34 is normally closed by a spring 40. Valve-cage 35 is slidable in valve chamber 38, being normally held against a shoulder 42 in the cylinder by a spring 43 so that if there is excessive pressure in the compression chamber of the cylinder the gas therein can escape around to chamber 38.

A suitable cut-off valve 44 serves to cut off communication between the compressor-cylinder and the oil-ducts. Duct 41 leads into the upper end of the chamber in the oil trap 39. The purpose of trap 39 is to separate the oil necessary to lubricate the piston, crank and cylinder of the compressor, should any be carried away with the compressed refrigerant. An additional check-valve 46 is included in duct 41 to prevent backflow of the gas in event the check-valve 34 or the compressor should become inoperative. The compressed refrigerant is thus forced into the chamber in the oil trap 39, the oil being of greater specific gravity than the vapor, collects in the trap and the compressed gas in the top of the trap is forced through a duct 48 in the top of head 49 which closes the upper end of the oil-trap, to a condensing coil 50. This coil is looped around the compressor-cylinder and the oil-trap and the other end thereof is connected to a duct 51 in the top 10ᵃ of base 10, to deliver the condensed refrigerant to chamber 11.

A hood 52 is secured upon the top of base 10 and incloses the condensing-coil, compressor-cylinder and the oil-trap. The chamber 56 in the hood serves to contain a body of water for condensing the refrigerant and also for cooling the compressor. The stem 44ᵃ of cut-off valve 44 terminates in the water-chamber 56 and this valve may be operated from the outside by a stem 57 which is mounted in the side of the hood and extends through a suitable stuffing-box 58ᵃ, to prevent water from escaping around stem 57. By inclosing these parts in the hood and circulating water therethrough, all possibility of the escape of odor or gas from the compressor, condensing-coil, oil-trap and all the connections therebetween will be effectively overcome, because the water absorbs the ammonia gas which might escape from the submerged devices. Furthermore, the number of fittings required in this system will be materially less than where the devices are separately mounted.

Water is supplied to chamber 56 by a pipe 58 which is connected to a port 59 in the top 10ᵃ of base 10. Water escapes from the chamber in the hood after circulating up and around the condensing-coil, the compressor and connections in the hood, through the upper end of an overflow pipe 53 which conducts the water to chamber 20 around the compressor-shaft, from which it escapes through a discharge pipe 54 which has a trap-bend 54ᵃ to keep chamber 20 filled with water. Thus, this water is utilized, not only for condensing the refrigerant and absorbing its gas or odor escaping from the compressor, oil-trap and connections, but also to absorb any refrigerant which might escape around the compressor shaft.

The supply of water to hood 52 is automatically controlled by a diaphragm-governor 71. This governor is connected by a pipe 72 to gage-pipe 67 which is connected to the condensing coil at 44 so that when the pressure in the condensing-coil exceeds a predetermined pressure, say 125 lbs. per square inch, the governor will operate a valve 73 which controls the flow of water to the hood. Valve 73 is included in pipe 58 which supplies water to the hood. Resultantly, the supply of water will be automatically controlled by this governor, which is operated or responds to the pressure of the refrigerant. Therefore, the supply of water for the condensing-coil, and for cooling the compressor will be automatically controlled.

The supply of refrigerating liquid is retained in a chamber in the base 10 from which it passes to the circulating line 9 at 70, under control of suitable automatic and pressure reducing mechanism, (not shown), as well understood in the art. The return side 9ᵃ of this circulating line is connected to duct 30. When the compressor is operated, the spent refrigerant under low pressure from the circulating line will pass from duct 30 to the compressor, and will be forced by the latter into the oil-trap 39. The compressed refrigerant will pass from the chamber in the upper end of the oil-trap through the condensing-coil 50 and thence into the chamber 11 as a liquid.

The oil collected in trap 39 may be returned to chamber 18 through a pipe 60 which is connected to the lower end of trap 39, extends outwardly through one side of the base, and delivers the oil into said chamber, a valve 61 being included in said pipe, which, when opened, will cause oil to be forced by the refrigerant under pressure in the oil trap, to said chamber 18. A gage 63 is suitably connected to chamber 18 to indicate the height of the column of oil in said chamber. A gage 64 is suitably connected to chamber 11 to indicate the height of the column of refrigerating liquid in said chamber. A pressure-gage 66 is mounted on the outside of the structure and connected, by means of a pipe 67, which contains the compressed refrigerant.

The invention thus exemplifies a refrigerating apparatus in which substantially all of the parts are inclosed within a single structure, and therefore, one in which use of a number of exposed fittings between the compressor, oil-trap, and refrigerant supply are avoided, to prevent the odor or fumes of the refrigerant from escaping and permeating the building or store, which has heretofore been an important objection to the installation of refrigerating systems in stores and houses where a separate room or space in charge of a competent operator was unwarranted. Furthermore, by employing such a structure and submerging the compressor, condenser-coil and oil-trap and the connections therebetween in the water, any odor of the refrigerant is effectively absorbed. By providing for circulation of water around the compressor shaft, no odor can escape through the shaft-bearings.

The apparatus in the main is composed into a single unit, which when associated with the circulating line can be readily installed at a comparatively low cost.

The invention is not to be restricted to the details shown and described, since these can be modified by the skilled mechanic without departing from the spirit and scope of the invention.

Having thus described the invention, what I claim as new and desire to secure by Letters Patent is:

1. In refrigerating apparatus, the combination of a base having two chambers therein, one for containing refrigerant, a compressor mounted on said base, a shaft mounted in said base, a crank on said shaft working in the other chamber in the base, and a circulating-line for the refrigerant.

2. In refrigerating apparatus, the combination of a base having two chambers therein, one for containing refrigerant, a compressor mounted on said base, a shaft mounted in said base, a crank on said shaft working in the other chamber in the base, a circulating line for the refrigerant, and a hood mounted on the base and inclosing the compressor.

3. In refrigerating apparatus, the combination of a base having two chambers therein, one for containing the refrigerant, a compressor mounted on said base, a shaft mounted in said base, a crank on said shaft, working in the other chamber in the base, a circulating line for the refrigerant, a condensing-coil around said compressor, and means mounted on the base and inclosing the coil and compressor.

4. In refrigerating apparatus, the combination of a base having two chambers therein, one for containing the refrigerant, a compressor mounted on said base, a shaft mounted in said base, a crank on said shaft working in the other chamber in the base, a circulating line for the refrigerant, a hood mounted on the base and inclosing the compressor and a condensing coil in said hood.

5. In refrigerating apparatus, the combination of a base having two chambers therein, one for containing the refrigerant, a compressor mounted on said base and comprising a shaft mounted in said base, a crank working in the other chamber in the base, a circulating line for the refrigerant, a hood mounted on the base and inclosing the compressor, and means for circulating the water through the hood.

6. In refrigerating apparatus, the combination of a base having two chambers therein, one for containing the refrigerant, a compressor mounted on said base, a shaft mounted in said base, a crank on said shaft, working in the other chamber in the base, a circulating-line for the refrigerant, a hood mounted on the base and inclosing the compressor, a condensing coil in said hood and means for circulating water through the hood.

7. In refrigerating apparatus, the combination of a base having two chambers therein, one for containing the refrigerant, a compressor mounted on said base, a shaft mounted in said base, a crank on said shaft working in the other chamber in the base, a circulating-line for the refrigerant, a hood mounted on the base and inclosing the compressor, a condensing-coil in said hood, and a motor for driving said shaft mounted on the top of the hood.

8. In refrigerating apparatus, the combination of a base, a compressor on said base, a compressor-operating shaft, a bearing in the base for said shaft, a circulating-line, means in the base for containing a refrigerant supply, a chamber being formed in the base around said shaft, and means for circulating water through said chamber to prevent the escape of gases through the bearing.

9. In refrigerating apparatus, the combination of a base, a compressor on said base, a compressor-operating shaft, a bearing in said base for said shaft, a circulating-line, means in the base for containing a refrigerant supply, a chamber being formed in the base around said shaft, a hood mounted on the base, means for supplying the water to the hood, and means for conducting the water passing through the hood to the chamber to prevent the escape of gases through the bearing around the shaft.

10. In refrigerating apparatus, the combination of a base, having a chamber for refrigerant therein, a compressor mounted on the base, a compressor-shaft mounted in the base, an oil trap mounted above the base, a condensing-coil, and a hood on the base and extending around and inclosing the compressor, the coil and the oil-trap.

11. In refrigerating apparatus, the combination of a base having a chamber for refrigerant therein, a compressor mounted on the base, a compressor-shaft mounted in the base, an oil-trap mounted above the base, a condensing-coil, a hood on the base and extending around and inclosing the compressor, the coil and the oil trap, and means for circulating water through said hood and around the coil, compressor and oil-trap.

12. In refrigerating apparatus, the combination of a base, a chamber for refrigerant therein, a compressor carried by the base, a compressor-shaft mounted in the base, an oil-trap mounted above the base, a condensing coil, a hood on the base and extending around and inclosing the compressor, the coil and the oil-trap, means for circulating water through said hood and around the coil, compressor and oil-trap, said base having a chamber therein around the shaft, and means for supplying water to the chamber around the shaft to prevent the escape of gases through the bearing.

13. In refrigerating apparatus, the combination of a base having two chambers therein, one for the refrigerant and the other for a lubricant, a shaft mounted in the base, a compressor operated by the shaft and mounted on the base, a coil above said base, a hood on the base for inclosing said compressor and coil, means for supplying water to the hood, the base having a duct therein, and a circulating-line connected to said duct and to the refrigerant chamber in the base.

14. In refrigerating apparatus, the combination of a base having two chambers therein, one for the refrigerant and the other for a lubricant, a shaft mounted in a bearing in the base above the chamber for the refrigerant, a crank on said shaft working in the chamber for the lubricant, a compressor mounted on said base and operated by said shaft, an oil-trap mounted above the base and the shaft, a condensing-coil above said base surrounding said compressor and oil-trap and a hood on the base extending around and inclosing the compressor, the coil and the oil-trap.

15. In refrigerating apparatus, the combination of a base having two chambers therein one for the refrigerant and the other for a lubricant, a shaft mounted in a bearing in the base above the chamber for the refrigerant, a crank on said shaft working in the chamber for the lubricant, a compressor mounted on said base and operated by said shaft, an oil-trap mounted above the base and the shaft, a condensing-coil above said base surrounding said compressor, an oil-trap and a hood on the base extending around and inclosing the compressor, the coil and the oil-trap, and means for circulating water through said hood and around the coil-compressor and oil-trap.

CHARLES C. HANSEN.
AUGUST P. ANDERSON.

Witnesses:
FRED GERLACH,
MILDRED A. STUMPF.